United States Patent [19]

Wallace et al.

[11] 4,420,883
[45] Dec. 20, 1983

[54] PRUNING APPARATUS OF THE COMPOUND ACTION HOOK AND BLADE TYPE

[75] Inventors: Edward M. Wallace, Longmeadow; Robert G. Gosselin, Springfield; Ernest D. Labarre, Holyoke, all of Mass.

[73] Assignee: Wallace Mfg. Corp., Enfield, Conn.

[21] Appl. No.: 277,927

[22] Filed: Jun. 26, 1981

[51] Int. Cl.³ .............................................. B26B 13/26
[52] U.S. Cl. .................................................... 30/251
[58] Field of Search ................... 30/246, 249, 250, 251, 30/245

[56] References Cited

U.S. PATENT DOCUMENTS

| | | | |
|---|---|---|---|
| 459,989 | 9/1891 | Bosch | 30/249 |
| 1,338,216 | 4/1920 | Dragus | 30/249 X |
| 1,801,675 | 4/1931 | Maguire | 30/249 X |
| 3,360,858 | 1/1968 | Cowley | 30/249 |
| 3,835,535 | 9/1974 | Robison | 30/249 |

FOREIGN PATENT DOCUMENTS 973102  9/1950  France ................. 30/251

*Primary Examiner*—Jimmy C. Peters
*Attorney, Agent, or Firm*—Kenwood Ross; Chester Flavin

[57] ABSTRACT

The invention discloses pruning apparatus of the compound action hook and blade type. At the upper end of a longitudinally-extending handle, a stationary hook is fixed and extends upwardly therefrom in a plane parallel to and offset from the longitudinally-extending plane of the handle. It defines a downwardly-facing arcuately-shaped limb-engaging-surface for engagement with a limb. There is a movable blade which has a cutting edge and is operable to be reciprocated in an intersecting manner through cutting and return strokes with relation to the engaged limb and to the limb engaging surface of the fixed hook. A lever is pivotally mounted relative to the hook and a link pivotally interconnects to each of the lever and movable blade. The hook and movable blade and lever and link are each disposed contiguous to a common vertical plane. A rope and pulley assembly operatively interconnects with the movable blade through the lever and link and has a free end extended to the lower extremity of the handle for effecting pivotal movement of the movable blade through the cutting stroke responsively to a manually effected pull. Spring means effects movements of the movable blade through a return stroke. An adjustable grip in the form of a manually engageable member has a sinuous opening therethrough for the extension of the rope thereinto and therethrough and therefrom in the slip free positioning and grasping of the grip relative to the rope for the facilitating of the application of a force on and substantially parallel to the rope.

8 Claims, 15 Drawing Figures

PRUNING APPARATUS OF THE COMPOUND ACTION HOOK AND BLADE TYPE

The invention relates to new and useful improvements and structural refinements in devices in the nature of pruners, and more particularly aims to provide a device of the compound action type which exploits the hook and blade features. It comprehends a pruning cutter intended to be supported upon the end of a relatively telescoping pole so as to be capable of pruning therewith the branches of trees, bushes and the like, at substantial distances from the operator.

The principal new and novel features of the invention are (1) a lopping shear with a compound action; (2) a pruning shear where the four chief components in the cutting head, namely the hook, cutting blade, lever and link, are each in confrontation with a common vertically-disposed plane, and (3) a limit stop means allowing the hand of the operator to be protected against unwanted telescoping of the upper pole relative to the lower pole and also permitting the ready adding of an extension member to the lower pole.

The conventional pole pruner known in the art includes an elongated handle, a cutting head assembly on one end of the handle comprising a fixed member operable to be engaged with a limb and a movable member operable to be swung through a cutting stroke with relation to the limb engaged by the fixed member. It normally includes a rope and pulley sub-assembly operatively connected with the movable member and extendable to the opposite end portion of the handle for effecting movement of the movable member through its cutting stroke in response to a manually effected pull on the rope and a spring subassembly for effecting movement of the movable member through its return stroke.

Various devices have been made heretofore to provide effective power means to cause movement of the cutting blade to inoperative position in pruning cutters of the type referred to but, in general, such arrangements have either been ineffective or are of such substantial complexity as to add materially to the cost of manufacture and to require the generation of substantial operating forces.

Part of the difficulties experienced in the use of known pruning cutters, especially at remote distances from the operator, have arisen from the fact that a true shearing type of cutter has been employed, such as in scissors, whereby parts of trees or bushes can become wedged between the relatively movable and stationary blades and substantially lock the same against ready opening or closing movement of the movable blade.

Another problem presented by known pole pruners has been in the area of bulkiness, such pruners usually presenting a relatively large area of mass widthwise so as to make it difficult to protrude the tool end into more confined areas for successful operation. This problem has been ameliorated by the arrangement of this invention which is more compact than anything heretofore known so as to allow the tool end to be readily projected into these more confined areas. The hook is spaced forwardly of the longitudinal axis of the handle ergo allowing easy access of the work into the operating area of the hook.

At the same time, an operating S-shaped lever is disposed in close adjacency to the plane of the hook and to the plane of the pole so that conjointly there is a minimum of twisting of pole relative to cutting head or twisting of cutting head relative to pole, a tendency aggravated by the fact that the usual cutting action normally ensues at the upper end of the pole as much as 8 or 10 or 12 feet above the operator's head.

The invention, in broader aspects, is embodied in a device offering: first, a significant stop feature which delineates a positive final limit stop on any closure of the telescoping poles; second, an extension system incorporating a fiberglass pole; third, an arrangement wherein all generated forces are confined inasmuch as the principal components of the operating head each abut or are contiguous to a common vertical plane wherefor torque set up is minimized, thereby leading to a more compact construction which may be protruded into more confined areas; fourth, a concealed spring return subassembly shielded against unwanted snagging; and fifth, a hook means spaced forwardly of the longitudinal axis of the handle affording easier access to the work.

Another feature of the invention is an adjustable hand grip for associating with the rope pull to effectively improve an operator's grip on the rope and thereby to facilitate his operation of the shear blade. The hand grip is exemplified in a plurality of versions, by each of which a rope pull arrangement for the operation of the pivotally mounted cutting or shearing blade can be more effectively controlled by allowing individual adjustments to attain a most effective grip according to the selected adjustment of the telescoping pole, all to the end of achieving an optimum tensile force in a line parallel to the line of pull and consequently an optimum cutting or shear blade operation with the application of a maximum of force.

These foregoing objects and other incidental ends and advantages will be more fully pointed out as the nature of the invention is better understood in the progress of the disclosure below.

While all of these objects are attainable in the preferred and disclosed embodiments, it is to be understood that, by utilizing the invention only in certain of its aspects, certain of the objects may be attained individually or in sub-groups without necessarily attaining all of the objects at once. That is, useful embodiments may be produced involving less than the whole.

The features which we consider to be new and novel with our invention will be better understood from a consideration of the following detailed description, when read in conjunction with the accompanying drawings in which.

Figure 1:
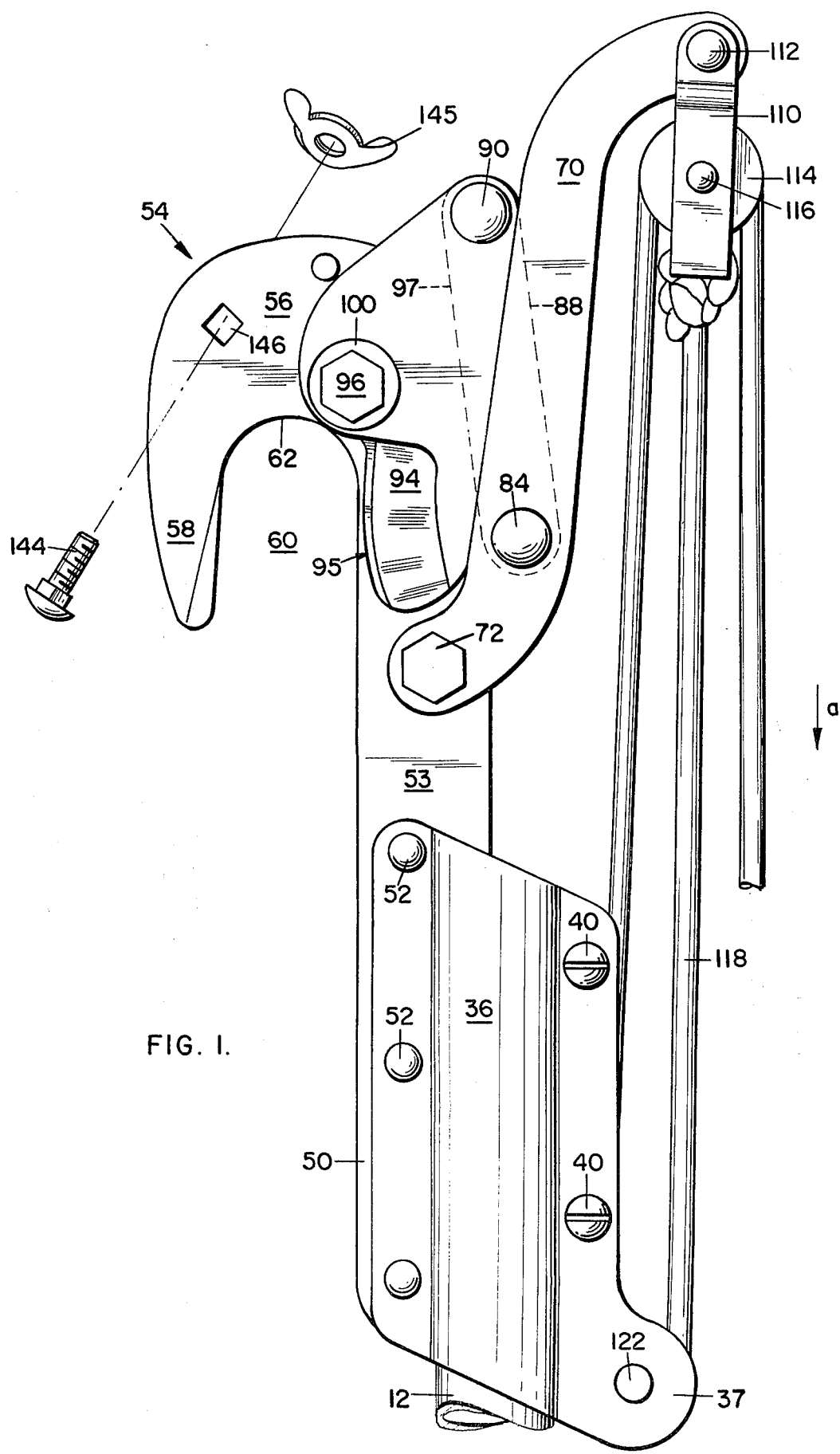
FIG. 1 is a fragmentary side elevational view of the upper portion of the pruning apparatus.

An elongated pole subassembly is shown as comprising a lower pole 10 in the form of a tubing of fiberglass or equivalent and an upper pole 12 which may be slidably receivable within and relative to lower pole 10 in a telescoping manner. A pin 14 is extendable transversely through the lower pole offering a stop for the upper pole as same is adjusted relative to the lower pole to the limit of its lowermost position.

An end cap 16 may be sleeved over the lower extremity of lower pole 10 for the usual enclosing function.

By removal of end cap 16, an extension pole can be sleeved over the end of lower pole 10 for the purpose of extending the length of the overall pole subassembly.

The two parts of a C clamp or coupling 20 are held together by rivets 22. The clamp is clamped to the upper extremity of lower pole 10 as by a clamp screw 24 and a clamp nut (not shown). The clamp is clamped to a selected position on upper pole 12 by a manually adjustable clamp knob 28 wherefor the upper pole can be adjusted relative to the lower pole to the end that an extended pole of any practical length is achievable.

By way of illustration, lower pole 10 may be of some 6' in length and upper pole 12 may be of somewhat similar length, to allow a total reach of some 12' in the fully extended attitude without the use of the extension.

C-clamp or coupling 20 offers the advantage that it is fixed on lower pole 10 at all times and may be adjustably secured to upper pole 12 by the loosening and tightening of clamp knob 28.

With the clamp knob loosened, the upper pole may be slid relatively to the lower pole to any desired position but with the pin providing the stop feature in the respect that the upper pole is precluded from further relative movement. By this means, an operator's hand is insured against being caught between the brackets (to be referred to) on the upper pole and the C-clamp as the upper pole is brought downwardly relative to the lower pole.

The cutting head assembly is carried at the upper extremity of the pole assembly frequently with a pruning saw carried by the cutting head, and with a rope and pulley assembly operatively connected with the cutting head and extending toward the opposite lower portion of the pole assembly for actuating the cutting head in response to a manually-effected pull.

Figure 2:
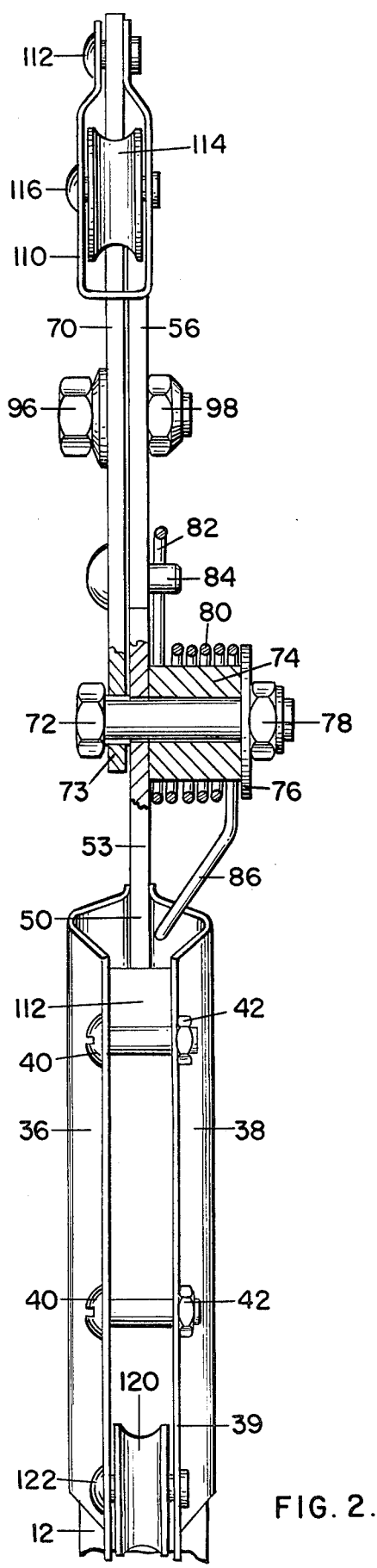
FIG. 2 is a fragmentary end elevational view of the FIG. 1 portion as viewed from the right.
Figure 3:
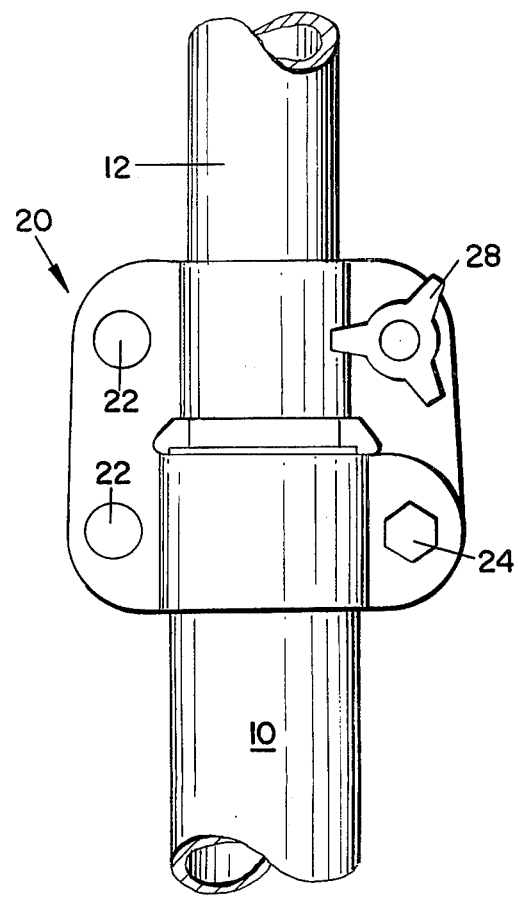
FIG. 3 is a fragmentary side elevational view of the coupling means for the upper and lower poles.
Figure 4:
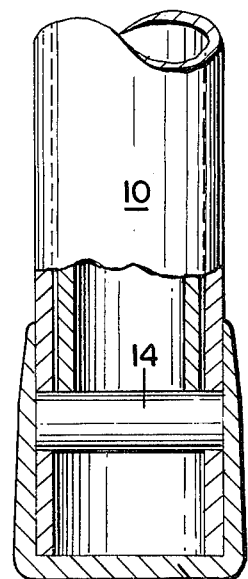
FIG. 4 is a fragmentary side elevational view of the lower extremity of the lower pole.

At the upper terminus of upper pole 12, a pair of opposed brackets, left hand 36 and right hand 38, is provided, same being brought into tightened circumscribing relationship with the upper pole as by bracket screws 40 and bracket nuts 42. See FIG. 2.

Additionally, the brackets also are held fast to the lower extremity 50 of a fixed member 54 defined as a hook as by bracket-to-hook rivets 52 with the hook element projecting vertically upwardly therefrom advantageously in a plane parallel to and offset from the longitudinally-extending plane of the axially-aligned poles 10 and 12.

Hook 54 is in the form of a rigid metallic member, the specifically preferred form shown being punched from steel plate stock so as to include the aforesaid lower elongated portion or extremity 50 being rigidly secured to and between brackets 36 and 38 as aforesaid, a first intermediate portion 53 extended upwardly therefrom and generally longitudinally therewith, a second intermediate portion 56 extending transversely of first intermediate portion 53 in a direction away from the longitudinally-extended plane of the poles, and a free end portion 58 extending downwardly from second intermediate portion 56 in spaced relation to first intermediate portion 54 in the definition of an inverted U-shaped operating area 60 by which a tree limb may be engaged.

A pivotal lever 70 is mounted on first intermediate portion 54 of the hook as by a lever bolt 72 extendable through aligned openings in the lever and hook and outboard thereof sufficiently to accommodate in sleeved relationship a lever bolt collar 73 and a spring collar 74 and a spring washer 76, with a lever nut 78 threadedly engageable with the lever bolt outboard thereof to facilitate the holding of the spring collar securely relative to the hook.

A coil spring 80 is sleeved around spring collar 74 with an upper terminus 82 having a bearing relationship with a lever-to-link pin 84 extended through an opening in lever 70, the coil spring being extended through a suitable opening in the pin. The lower terminus 86 of the coil spring has a bearing relationship against the inside wall of right hand bracket 38. See FIG. 2.

Pivotally related to lever 70 by lever-to-link pin 84 is a link 88. The upper end of link 88 mounts, through a link-to-blade rivet 90, a movable shearing or cutting blade 94, which blade is also pivotally mounted on the second intermediate portion 56 of the hook as by a blade bolt 96, a blade nut 98, and a blade washer 100.

The pivotal cutting or shearing blade, the movable member in the cutting action, is operable to be moved through a manually actuated cutting stroke with relation to a limb engaged between the fixed hook and movable blade and also to be moved through a return stroke through the stored energy in the coil spring.

The shearing or cutting blade is preferably in the form of a rigid metallic member, the specific embodiment shown again being punched from plate steel stock and suitably heat treated to define a thin, single bend, curved cutting edge 95 and a lever arm portion 97.

The blade offers a planar surface such that, when mounted operatively with respect to the hook, the fixed member, it is disposed in an adjacent plane relative thereto for pivotal movement between a pair of limiting positions about an axis extending perpendicular to the planes of the hook and blade, with cutting edge 95 intersecting planar edge 62 of the hook within the operating area in a bypassing manner as the blade is driven between its limits of movement in the cutting stroke.

If desired, the blade may be limited in its pivotal movement about its axis between two limiting, fully-opened and fully-closed, positions by suitable means, such as stop pins.

The upper extremity of lever 70 mounts a depending pulley strap 110 by means of a strap-to-lever rivet 112, the upper pulley 114 being rotatably supported relative to the pulley strap as by a pulley rivet 116.

One terminus of a rope 118 is fixed to the pulley strap below the upper pulley and is extended downwardly therefrom for entrainment around a lower pulley 120 secured by rivet 122 to and between the opposite ears 37 and 39 on the opposite brackets 36 and 38. The rope is then entrained upwardly and around upper pulley 114, with its opposite free terminus being passed downwardly toward the region of the lower pole.

The location of the spring return mechanism offers the advantage that it does not extend beyond the profile of the cutting head so as not to be exposed to the work area.

One additional feature resides in the fact that the pivot of the blade is not on the handle center line; rather it is forwardly thereof so as to minimize torquing.

Figure 5:
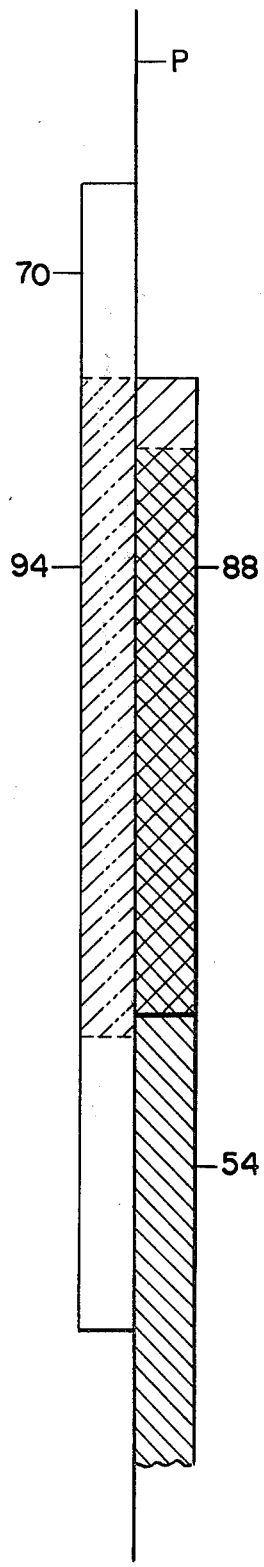
FIG. 5 is a schematic view showing the principal components of the cutting head in phantom and their contiguity to a common vertical plane.

It is stressed that hook 54, cutting blade 94, lever 70 and link 88 are each so disposed that they are each in confrontation with a common vertically-disposed plane P, schematically shown in FIG. 5. Friction and binding as well as lateral flexure of components are minimized by this arrangement.

That is, the construction offers the salient advantage that all of the forces generated are in that plane so as to prevent the generation of any unnecessary torque, hook 54 and link 88 being disposed on one side of the plane and lever 70 and blade 94 being disposed on the opposite side of that plane, all allowing a more compact head enabled to be projected or protruded into more confined areas.

The coil spring offers the further advantage that it is located on the same pivot as the lever pivot so as not only to represent a savings in parts but more significantly to allow the disposition of the pivots in more of a vertical line.

With the usual pole pruner, the operator is called upon to grip the actual rope or cord in order to apply the requisite pulling force, dictating such a manual grasp as to preclude hand slippage axially of the rope, yet to exert a tensile force sufficient to operate the shearing blade. Plastic pull ropes have, in some cases, been used in lieu of the usual hemp or cotton fiber ropes in the aim to ameliorate the problems of discomfort so commonly experienced by users, particularly in those cases where relatively thicker harder-to-cut branches are encountered. But even with these substitutes, grasping difficulties are experienced because of the smooth exterior surfaces of the plastic materials.

Accordingly, in this invention, several forms of hand grips are envisioned which are easy to hold and to pull upon when manually grasped by the operator, which grips are easily repositionable along the rope length so as to accommodate to any particular length of the pole handle and allow him to adjust the hand grip to that particular position where he feels that he can achieve his best leverage.

The handle may be formed of wood or plastic or other material to present a smooth exterior surface around which an operator's clenched fist may comfortably conform, finger engaging depressions being provided in the pursuit of that purpose.

Figure 7:
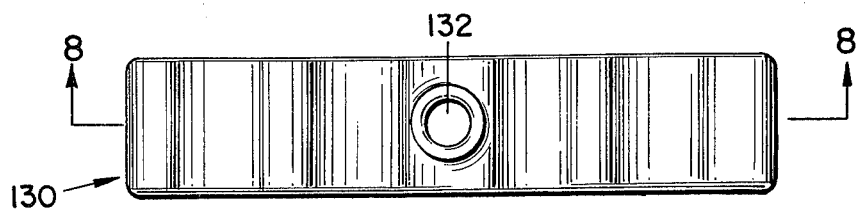
FIGS. 7, 8 and 9 are top plan, sectional and bottom plan views respectively of one form of operating handle of the invention.
Figure 8:
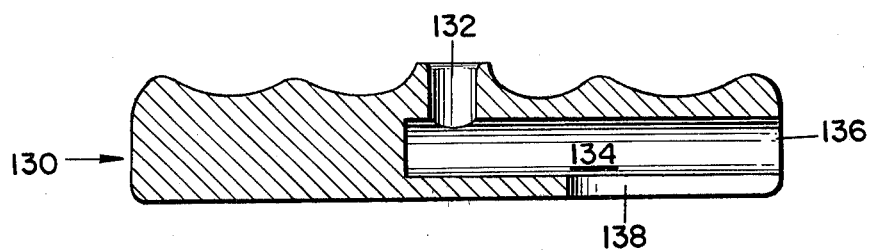
Figure 9:
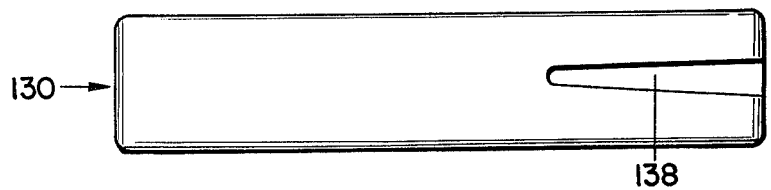
Figure 6:
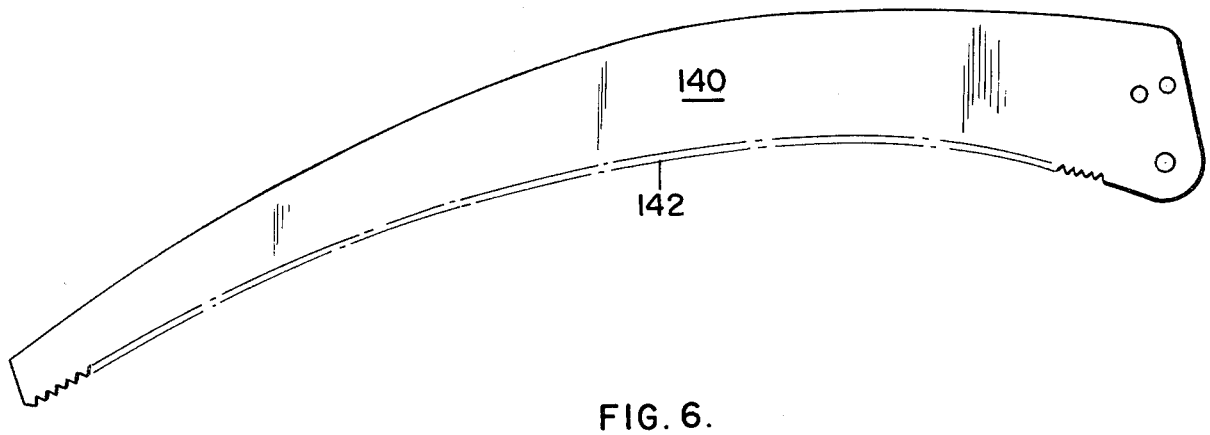
FIG. 6 is a side elevational view in small scale of the saw of the invention.

A first form of hand grip 130 is shown in FIGS. 7, 8 and 9 which is locatable at any desired position along the rope length and is suitably sized and configured to allow comfortable gripping.

The hand grip is provided at its upper surface with a central opening 132 leading vertically downwardly therefrom and communicating with a horizontally-disposed longitudinally-extending circular recess 134 extended inwardly from one end 136 of the hand grip, opening 132 and recess 134 being each of a size slightly in excess of the rope diameter to allow easy extension of the rope therethrough. Also extending inwardly from end 136 is a vee notch 138 which is disposed longitudinally in parallelism with and below recess 134 and in communication therewith through a portion of its length.

The rope, entrained through opening 132 and recess 134, may be extended outwardly thereof so as to allow a bight on the rope to be taken, at the proper desired position therealong, by bringing the rope as far into the notch as is allowed, the thus snug engagement achieved being such as to prevent relative slippage of hand grip to rope.

It is a simple matter to readjust the handle, should a repositioning be desired, merely by the disengagement of the rope from the notch and the movement of the rope relative to the hand grip both in the desired direction and along the necessary length.

A downward tension exerted through the hand grip will serve to pull the rope along the line of pull indicated by arrow a in FIG. 1, with such pulling force being operatively connected through the train to the shear blade.

Adjustments in the tautness of the rope with reference to the hand grip may be easily and readily accomplished by the disengagement of the rope from the notch and the manipulation of the hand grip relative to the rope.

The notch serves to engage and impinge the rope so that it may be pressed against the notch side walls so that movement of the rope with respect to the handle is precluded.

Any strain at either side of the hand grip will only cause the notch to more securely clench and bind the rope to the end of insuring against disengagement.

The angularity of the slot relative to the direction of pull of the line via the hand grip is such that the binding and clenching action increases accordingly as the pulling forces on the rope increase.

Figure 10:
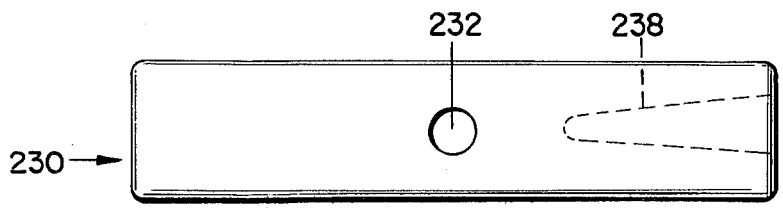
FIGS. 10, 11 and 12 are views, similar to FIGS. 7–9, of a second form of operating handle.
Figure 11:
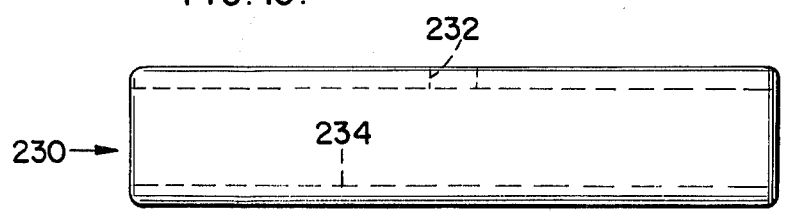
Figure 12:
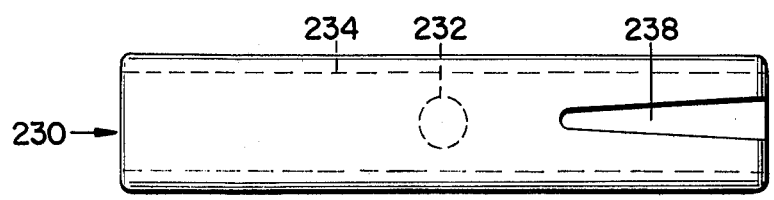

A second hand grip 230 is shown in FIGS. 10, 11 and 12, likewise locatable along the rope length as desired, and similarly sized and configured for comfortable gripping.

The hand grip is provided at its upper surface with a central opening 232 which leads downwardly therefrom and communicates with a longitudinally-extending circular opening 234 extending through the hand grip from end-to-end. Opening 232 and recess 234 are each of a size in excess of the rope diameter to allow its easy passage therethrough.

Also extending inwardly from end 236 of the hand grip is a V-shaped notch 238 extending longitudinally in parallelism with and below opening 234 for a portion of its length and in communication therewith.

The rope is extended into and through opening 232 and through and outwardly of opening 234 to allow a bight on the rope to be taken, again by the bringing of the rope as far into the notch as is allowed, the thus snug engagement preventing relative slippage of hand grip to rope.

Figure 13:
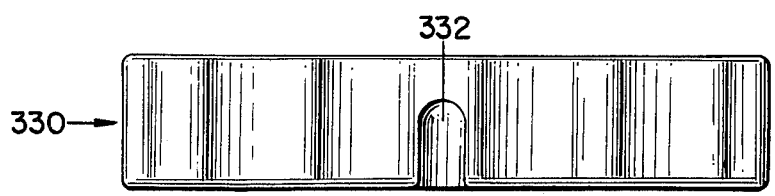
FIGS. 13, 14 and 15 are views, similar to FIGS. 7-9, of a third form of operating handle.
Figure 14:
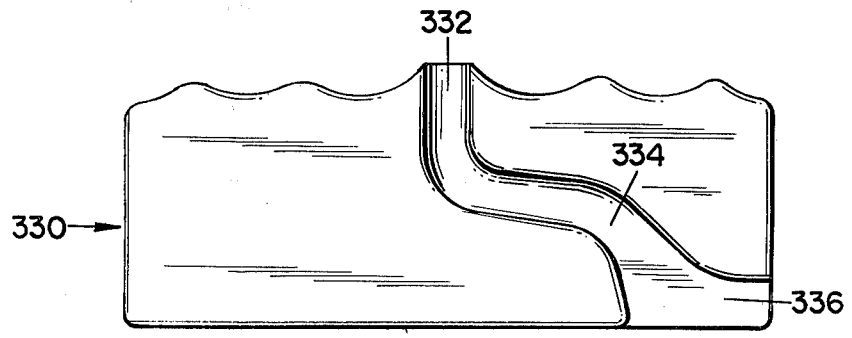
Figure 15:
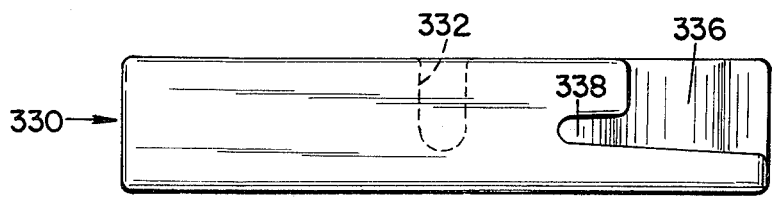

A third form of hand grip 330 is shown in FIGS. 13, 14 and 15 which is locatable at any desired position along the rope length and is suitably sized and configured so as to allow comfortable gripping.

The hand grip is provided at one side of its upper surface with a central groove 332 extending inwardly at one end thereof and leading downwardly therefrom and communicating with a sinuous groove 334 on one side of the grip.

Also extending inwardly from end 336 is a V-shaped notch 338 which communicates with the groove.

The rope extended through the groove may be extended outwardly thereof so as to allow a bight on the rope to be taken, at the proper desired position therealong, by the bringing of the rope as far into the region of the notch as is allowed, the thus snug engagement preventing relative slippage of hand grip to rope.

The rope may advantageously be readily removed from the groove by simply disengaging the rope from its notch and separating the rope and hand grip by moving the one laterally from the other.

A concavely curved pruning saw 140 having cutting teeth 142 may be detachably and fixedly secured to the hook as by a bolt 144 extended through a suitable opening 146 in the hook and a nut 145. See FIG. 1.

The claims are desired to include within the scope thereof all of the said suitable variations, modifications and equivalents by which substantially the results of the invention may be obtained through the use of substantially the same or equivalent devices or means. Accordingly, limitation hereof should only be made as determined by a proper interpretation of the prior art and the scope of the subjoined claims, in which it is my intention to claim all novelty inherent herein as broadly as possible.

We claim:

1. A rope-actuated pruning apparatus incorporating a compound leverage force for oscillating a cutting blade comprising:
a handle,
a hook fixed to the handle and defining a downwardly-facing limb engaging-surface,
a movable blade having a cutting edge and being oscillatable for defining cutting and return strokes in intersecting relationship with the limb-engaging-surface of the hook,
a lever pivotally mounted relative to the hook,
a link pivotally connected to each of the lever and blade,
the hook and blade and lever and link being each in surface confrontation with a common vertically disposed plane,
a rope and pulley assembly operatively interconnecting with the blade through the lever and link and having a manually engageable free end for effecting pivotal movements of the blade through the cutting strokes, and
spring means for effecting movements of the blade through the return strokes.

2. In pruning apparatus having a compound leverage force comprising:
a handle,
a hook fixed to and extending from the handle and defining a downwardly-facing limb-engaging-surface,
a movable blade having a cutting edge and being pivotable for defining cutting and return strokes in intersecting relationship with the limb-engaging-surface of the hook as the blade is moved between the fully-opened and fully-closed positions,
a lever pivotally mounted relative to the hook,
a link pivotally connected to each of the lever and blade,
a rope and pulley assembly operatively interconnecting with the blade through the lever and link and having a manually engageable free end for effecting pivotal movements of the blade through the cutting strokes, and
spring means for effecting movements of the blade through the return strokes with the link and hook being movable into intercontacting stop positions in the fully-opened and fully-closed positions.

3. In a rope-actuated pruning apparatus of the compound lever type, the combination of:
a handle,
a hook extending upwardly from and fixed to the handle and having a mouth defining a downwardly-facing limb-engaging-surface,
a cutting blade being pivotable relative to the hook for defining cutting and return strokes in intersecting relationship with the mouth of the hook as the blade is oscillated between fully-opened and fully-closed positions,
an S-shaped lever pivotally mounted relative to the hook,
a link pivotally connected to each of the lever and blade,
the hook and blade and lever and link each being disposed with a face in a contiguous relationship to a common vertical plane,
the hook and link being in abutting relationship with each other in the fully-opened and fully-closed positions,
the blade and lever being in abutting relationship with each other in the fully-opened position,
a pulley assembly connected to the lever and a rope entrained thereover and having a manually engageable free end for effecting pivotal movements of the blade through the cutting strokes from the fully-opened position, and
spring means for effecting movements of the blade through the return strokes from the fully-closed position.

4. In a rope-actuated shear construction of the long-handle pruner type having a compound leverage force the combination of:
a longitudinally-extending handle,
a hook having an elongated extension fixed to and extending upwardly from the handle and in a longitudinal plane parallel to and offset from the longitudinal plane of the handle and defining a mouth comprising a downwardly-facing limb-embracing-surface,
a cutting blade pivoted relative to the hook for swinging between fully-opened and fully-closed positions in cutting and return strokes in intersecting relation with the limb-embracing-surface of the hook,
an S-shaped lever pivoted to the hook,
the blade being nestable in the configuration of the S-shaped lever in the fully-opened position,
a link pivoted to each of the lever and blade,
a rope and pulley assembly mounted on the lever for effecting pivotal movements of the blade through the cutting strokes responsively to a manually effected pull of the rope, and
spring means for effecting movements of the blade through the return strokes.

5. A rope-actuated pruning apparatus incorporating a compound leverage force for oscillating a cutting blade comprising:
a handle,
a hook fixed to the handle and defining a downwardly-facing limb-engaging-surface,
a blade being oscillatable between fully-opened and fully-closed positions and defining cutting and return strokes in intersecting relationship with the hook limb-engaging-surface,
a lever pivotally mounted relative to the hook,
a link pivotally connected to each of the lever and blade,
the hook and blade and lever and link being each in surface confrontation with a common vertically disposed plane for minimizing torque during the cutting and return strokes, a rope and pulley assembly operatively interconnecting with the blade through the lever and link and having a manually engageable free end for effecting pivotal movements of the blade away from the fully-opened position through the cutting strokes, and spring means for effecting movements of the blade away from the fully-closed position through the return strokes.

6. A pruner operable from ground level for cutting tree limbs comprising:

a longitudinally-extending pole including an upper pole telescopically receivable within and slidably adjustable relative to a lower pole, a hook fixed to the upper pole and defining a downwardly-facing operating area for engagement over a limb-to-be-severed, a blade pivotally mounted on the hook and being swingable in pass-by manner between fully-opened and fully-closed positions through cutting and return strokes with relation to the operating area of the hook, an actuating lever pivoted to the hook, a link pivoted to both the lever and blade, the hook and link being in planar alignment and edge facing position and the lever and blade being in planar alignment and edge facing position with the confronting faces of the hook and link and lever and blade defining a common contiguous plane, a pulley assembly operatively connected to the lever and a rope entrained therearound and having a manually engageable free end for actuating the blade from the fully-opened position through the cutting strokes, a tension spring tensioned by the movement of the blade through the cutting strokes for effecting biasing of the blade from the fully-closed position through the return strokes upon release of the pull on the rope.

7. In a shear construction of the long-handle pruner type having a compound leverage force the combination of:

a longitudinally-extending handle, a hook having an elongated extension fixed to the upper extremity of the handle and extending in a plane parallel to and offset from the longitudinally-extending plane of the handle and defining a downwardly-facing arcuately-shaped limb-embracing-surface and offering a forward presentation of the hook relative to the longitudinal axis of the handle, a blade being pivotally mounted on the hook for oscillation between fully-opened and fully-closed positions through cutting and return strokes in intersecting relation with the limb-embracing-surface of the hook, a lever pivoted to the hook, a link pivoted to the lever and the blade, the hook and link being in coplanar alignment and edge confronting position as to each other, the lever and blade being in coplanar alignment and edge confronting position as to each other with the confronting faces of the coplanar hook and link and the coplanar lever and blade defining a common contiguous plane, a rope and pulley assembly supported by the lever for effecting pivotal movements of the blade through cutting strokes responsively to a manually effected pull of the rope, and spring means for effecting movements of the blade through the return strokes.

8. Compound leverage force type lopping shear of the hook and blade type comprising:

a handle, a hook fixed to the handle and defining a downwardly-facing limb-engaging surface, a blade swingable relative to the hook in a pass-by manner through cutting and return strokes with reference to the hook limb-engaging surface, the hook and blade having planar surfaces common to a plane at the interface therebetween, a lever pivotally mounted relative to the hook, a link pivotally connected to each of the lever and blade, the lever and link having planar surfaces common to a plane at the interface therebetween, a rope and pulley assembly for facilitating movements of the blade from the fully-opened position through the cutting strokes relative to the hook responsively to a manually-effected pull on the rope, and spring means for effecting movements of the blade from the fully-closed position through the return strokes.

* * * * *